US010564640B2

United States Patent
Schwindt et al.

(10) Patent No.: US 10,564,640 B2
(45) Date of Patent: Feb. 18, 2020

(54) SYSTEM AND METHOD FOR SENSING THE DRIVING ENVIRONMENT OF A MOTOR VEHICLE

(71) Applicant: Robert Bosch GmbH, Stuttgart (DE)

(72) Inventors: Oliver F. Schwindt, Palo Alto, CA (US); Karsten Muehlmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 15/825,568

(22) Filed: Nov. 29, 2017

(65) Prior Publication Data

US 2018/0173232 A1    Jun. 21, 2018

(30) Foreign Application Priority Data

Dec. 21, 2016    (DE) .................. 10 2016 225 915

(51) Int. Cl.
*G05D 1/00* (2006.01)
*G06K 9/00* (2006.01)
*G05D 1/02* (2006.01)

(52) U.S. Cl.
CPC ......... *G05D 1/0088* (2013.01); *G05D 1/0231* (2013.01); *G06K 9/00791* (2013.01); *G05D 2201/0213* (2013.01)

(58) Field of Classification Search
None
See application file for complete search history.

(56) References Cited

U.S. PATENT DOCUMENTS

| 2016/0357188 | A1* | 12/2016 | Ansari | G05D 1/0212 |
| 2017/0109644 | A1* | 4/2017 | Nariyambut Murali | |
| | | | | G06N 20/00 |
| 2017/0242095 | A1* | 8/2017 | Schuh | B60W 30/16 |
| 2017/0329332 | A1* | 11/2017 | Pilarski | B60W 50/0097 |
| 2018/0068206 | A1* | 3/2018 | Pollach | G06K 9/00791 |

FOREIGN PATENT DOCUMENTS

DE    102011086402 A1    5/2013

* cited by examiner

*Primary Examiner* — Thomas G Black
*Assistant Examiner* — Demetra R Smith-Stewart
(74) *Attorney, Agent, or Firm* — Norton Rose Fulbright US LLP; Gerard Messina

(57) ABSTRACT

A system and a corresponding method for sensing the driving environment of a vehicle, the system having a plurality of sensors for capturing objects in the area surrounding the vehicle. The system has a plurality of evaluation units, an evaluation unit being bijectively associated in each case with a specific sensor and being adapted for analyzing a measurement performed by the sensor using a sensor model and for creating a data object to describe a particular object captured by the sensor. In addition, at least one driving-environment modeling unit is provided that is linked to each evaluation unit and is adapted for computing a driving environment model to describe the environment of the vehicle on the basis of the data objects. An evaluation unit and the at least one driving-environment modeling unit are thereby designed in a way that makes the sensor model more complex than the driving environment model.

12 Claims, 3 Drawing Sheets

SYSTEM AND METHOD FOR SENSING THE DRIVING ENVIRONMENT OF A MOTOR VEHICLE

CROSS REFERENCE

The present application claims the benefit under 35 U.S.C. § 119 of German Patent Application No. DE 102016225915.6 filed on Dec. 21, 2016, which is expressly incorporated herein by reference in its entirety.

FIELD

The present invention relates to a system and a method for sensing the driving environment of a motor vehicle. In particular, the present invention relates to a system and a method for sensing the driving environment of a motor vehicle using a plurality of sensors.

BACKGROUND INFORMATION

It is increasingly important in motor vehicle control to capture the surroundings of a motor vehicle. To provide the particular properties of the autonomous driving function or of the driver assistance function, autonomous driving functions, as well as driver assistance functions are thereby based on automatically detecting the driving environment of the vehicle. Radar, lidar sensors, video sensors, cameras, ultrasonic sensors, etc., are typically considered to be suited for sensing driving environments.

With regard to driver assistance functions, in particular, past development trends began with individual sensor technologies and continued towards the use of a multitude of sensors. These sensors each deliver measurement data that can be analyzed to determine position and/or orientation. Such systems thereby require means for fusing data from the various sensors. Thus, fusing the results from a plurality of sensors makes it possible to improve a localization of the vehicle relative to the environment thereof. The number of sensors required for automated driving tends to be greater than the number required for a simple driver assistance function, so that an automated driving system can have 10 or 20 sensors, for example, that deliver a correspondingly greater amount of data than is typical of driver assistance systems.

German Patent Application No. DE 10 2011 086 402 A1 describes a method and a driver assistance system for capturing a vehicle environment; on the one hand, an optical sensor system being linked via an image processing module and object detection module to a module for further processing, and, on the other hand, an ultrasonic system being linked via an ultrasonic signal-processing module to the same. The module for further processing has a data fusion module in which the data from the image processing module and the ultrasonic signal-processing module are merged.

Against this background, there is a need in related-art driving-environment sensing systems for vehicles, for optimizing the data fusion of sensor data in order to enhance the performance for processing the sensor data, thereby enabling the driving environment to be captured quickly and robustly.

SUMMARY

In accordance with the present invention, a system and a method are provided for sensing the driving environment of a vehicle.

Preferred example embodiments of the present invention are described herein.

An aspect of the present invention provides a method for sensing the driving environment of a vehicle. The method basically includes the following steps:

capturing objects in the area surrounding the vehicle using a sensor system having a plurality of sensors;

analyzing at least one measurement performed by the sensor, using a sensor model, via an evaluation unit that is bijectively linked to the particular sensor;

creating a data object to describe an object captured by the sensor, via the evaluation unit, on the basis of the analysis;

receiving of the corresponding data objects from the evaluation units by a driving-environment modeling unit that is linked to each evaluation unit; and computing a driving environment model, that may be used as a basis for the control commands of a planning module of an at least partially automated or autonomous vehicle driving mode, via the driving-environment modeling unit, on the basis of the data objects.

The method provides that a sensor model and a driving environment model be used where the sensor model is more complex in design than the driving environment model.

An aspect of the present invention also provides a system for sensing the driving environment of a vehicle that features a plurality of sensors for capturing objects in the area surrounding the vehicle. The system has a plurality of evaluation units, in each case, an evaluation unit being bijectively associated with a specific sensor and being adapted for analyzing a measurement performed by the sensor, using a sensor model, and for creating a data object to describe a particular object captured by the sensor. Moreover, the system features at least one driving-environment modeling unit that is linked to each evaluation unit and is adapted for computing a driving environment model to describe the area surrounding the vehicle on the basis of the data objects that may be used as a basis for control commands of a planning module of an at least partially automated driving mode. The design of an evaluation unit and of the at least one driving-environment modeling unit is such that the sensor model is more complex than the driving environment model.

Thus, the aspects of the present invention make possible an improved component fusion when a sensor system is used for sensing the driving environment. In particular, a high-performance system may be realized, where data from a plurality of sensors may be combined, the system being especially well suited for running on a computer system having a plurality of processors or a plurality of processor cores. The present invention may also make it possible to substantially utilize a design of a plurality of threads mutually in parallel. Thus, the performance of the present invention is more readily scalable than under the related art. This is made possible by the architecture described herein, i.e., inter alia, by the advantageous properties that make it possible to substantially transfer the complexity into the sensor models, and, in relative terms, keep the complexity of the driving environment model or of the world model to a minimum. The terms driving environment model, world model, and model may be used synonymously in the following description. The terms world object, object, and data object may also be used synonymously; it being apparent from the context in each case whether a real object in the vehicle environment or a virtual data object in the system is meant.

A degree of complexity may be evaluated or ascertained in accordance with generally known criteria. The resources required for implementing a particular step, for example, may be thereby considered. It is possible, in particular, to consider the computational or temporal resources required for implementing an object association, an object initialization, an object classification, or for updating a driving environment model.

In a preferred specific embodiment, each sensor model has a polynomial complexity. It is especially preferred if the sensor model has a quadratic complexity. On the other hand, a driving environment model may have a linear complexity, as already indicated.

The architecture of the present invention makes it possible, in particular, to also robustly counter a required safety aspect. Thus, for example, in a case where the processing requires a great deal of time for one sensor, it is possible to inherently avoid a delay of a task relating to the entire system.

It is preferred that a plurality of different types of sensors, in particular, be used in parallel. Depending on the sensor and evaluation unit, a sensor model may, in particular, be a radar model, a lidar model, a camera model, an ultrasonic model, or also a different model.

Furthermore, the sensor models may also be multi-instance capable, so that, depending on the need, the same type of sensor may be provided and used several times in the ego vehicle or host vehicle, it being possible for the corresponding sensor model to be repeatedly used. The manufacturing complexity and costs for the evaluation units and the sensor models may thereby be minimized, particularly with regard to an implementation as a computer program product.

Aspects of the present invention may be employed quite advantageously in connection with an automated driving vehicle.

In addition, aspects of the present invention also allow single sensor classification methods, as are often used in connection with driver assistance functions.

Thus, one preferred embodiment provides that a particular evaluation unit be designed for classifying a data object to describe a type of recorded object.

Still another preferred embodiment of the present invention provides that a dynamic driving environment model be used. In this approach, the driving-environment modeling unit may be adapted for updating the driving environment model on the basis of a sequence of times of the basic measurements performed by the sensors.

A plurality of driving environment models may be used in parallel in the system and the method. In this regard, a plurality of driving-environment modeling units may be provided that each compute a driving environment model.

Preferably, each driving-environment modeling unit is linked to every evaluation unit. However, an individual driving-environment modeling unit linked to every evaluation unit may also compute a plurality of driving environment models.

The driving environment models preferably feature at least one dynamic driving environment model and at least one static driving environment model.

Thus, two separate modules may be used: one for the dynamic world and one for the static world. These modules may be configured as separate units, enabling them to simultaneously execute the corresponding computations, whereby the different requirements or objectives may be taken into account.

This not only enables each sensor model to be handled in a separate thread, regardless of whether this is actually done in a real example, but also, instead of a variant having an individual world model, different world models, such as a dynamic and static driving environment model, are used that are able to be operated in different threads.

It is preferred that such a dynamic driving environment model or world model capable of computing the derivative of measured values be able to be provided, enabling a current acceleration and yaw rate to always be known, for example. Moreover, due to the relatively low complexity, the dynamic model may provide a rapid response, thereby enabling dynamic variations of observed vehicles, such as a full braking or a sharp steering movement, to be quickly identified. The size or the gradation of the sizes of the observed vehicles may be kept to a limited number in the model and, for example, vary from a motorcycle size to a truck size.

On the other hand, a static driving environment model or a static world model may also be preferably provided to describe more complicated shapes that may also be virtually represented, substantially continuously. Examples of these may include guardrails or concrete walls. In the static world model, more importance may be attached to distinguishing among obstacles, such as automobiles, walls, posts, etc., and non-obstacles, such as bridges, potholes, etc., there being no need for a dynamic assessment to be made in the static case. Thus, a response time for updates may be less time-critical than in the case of the dynamic world.

Due to the lower complexity of the world models provided by aspects of the present invention in comparison to the sensor models, it is possible to satisfy the requirement of a system design whereby both modules, i.e., the dynamic driving environment model and the static driving environment model, do not fail, and whereby the necessary computations are not too time-consuming. In particular, the world models may be kept simple. It is thereby preferred that they merely feature functions of creating, updating and erasing data objects. In this context, creating an object may signify that an object delivered by the sensor model is merely inserted into the driving environment model.

In accordance with an especially advantageous embodiment, a plurality of dynamic driving environment models are provided. A first dynamic driving environment model may thereby be less complex than a second dynamic driving environment model.

In such an embodiment, the first dynamic driving environment model, which is relatively less complex, may be updated using a relatively simple method, such as a Kalman filter. Moreover, the objects in the simple dynamic model may be described using simple geometric objects, such as cuboids.

On the other hand, the second dynamic driving environment model, which is more complex, may be updated using a more complex method, such as a particle filter. Moreover, more complex geometric constructions may be used to describe the objects in the more complex dynamic model, making it possible to reproduce the actual shape of the object to be described with relatively greater accuracy using the data objects in the relatively complex model.

It should thereby be noted that both the relatively simple, first dynamic model, as well as the relatively complex, second dynamic model may both be less complex than a sensor model. For example, both dynamic models may feature a linear complexity, however, each with a different factor.

Since, as mentioned above, a sensor model is more complex than a world model, it may perform the entire work with respect to associating, initializing and, if necessary, classifying the data objects.

The time of observation of a sensor model may preferably be set to the point in time when the data were measured for the corresponding sensor. Moreover, for every measurement, the system may add a corresponding time stamp of the current time of the measurement.

The last known objects in the system, i.e., the current world objects or data objects, may preferably be transformed relative to the host vehicle, in order to thereby allow for the corresponding spatial changes in perspective that have occurred. For that purpose, a particular evaluation unit may be adapted for transforming a driving environment model to the time of a current measurement and for considering or compensating for an intermediate movement of the ego vehicle.

Data objects may also be predicted or calculated back in the case of a dynamic driving environment model. In this regard, the evaluation unit may be adapted for predicting or back-calculating properties of data objects on the basis of the transformation.

As a result, the currently known data objects or world objects are all in the same time frame as the measurements performed. This signifies, inter alia, that new measurements may be compared in a simple and appropriate manner, and that an association may also readily take place.

Thus, a preferred embodiment provides that each evaluation unit be adapted for associating a measurement with an object described by the driving environment model, it being possible to compare the measurement to existing data objects.

Thus, the measurement data may be assigned in each case to an existing world object or to an object in the vehicle's surrounding field and transferred to the world thread, i.e., to the computed sequence of the current, changing data objects in the driving-environment modeling unit. After that, the updating function may, therefore, be performed, which, as already indicated, may feature the use of a central Kalman filter that may preferably be applied in the sequence of the measurements. This makes it possible to minimize what are generally referred to as out-of-sequence effects, that are to be procedurally considered or handled.

With respect to a tracking initialization, another preferred embodiment provides that the sensor model be used to enable each of the evaluation units to also be designed to analyze a number of stored measurements that are not yet associated with any captured object. On the basis of this analysis, the evaluation unit may possibly produce or create a new data object.

Thus, a track initialization functionality may be provided in the sensor models that may be configured, in particular, to run in different threads. As already mentioned, these new data objects may be transferred to the world model or to the driving environment models in the driving-environment modeling unit.

One special embodiment of the present invention provides that all measurements, not yet assigned to an object, be stored in a buffer together with a specific time history.

In this regard, a measurement, including the time stamp mentioned above, may be stored in a buffer memory for a later use, it being possible to continuously analyze the buffer to determine whether new data objects or object tracking are/is to be currently created.

The particular evaluation unit may preferably thereby provide the measurement with the time stamp, and the buffer memory may be linked to the particular evaluation unit or incorporated therein.

When a time history is used, it is advantageously possible to prevent new objects from being created by noise. Such a stored time history may also be advantageous when all states required for a dynamic object are not able to be measured using an existing sensor.

It is preferred that new data objects already be created in the form of a world object state, so that they merely need to be added in the world model when the output from an existing sensor is read out through the corresponding world thread or the driving-environment modeling unit.

In addition, preferred embodiments provide that an evaluation unit be adapted for receiving a respective copy of the current driving environment model containing the most recently created data objects, from the driving-environment modeling unit, respectively the plurality thereof, for use in the respective sensor model.

BRIEF DESCRIPTION OF THE DRAWINGS

Preferred embodiments of the present invention are explained in greater detail below with reference to the figures.

DETAILED DESCRIPTION OF EXAMPLE EMBODIMENTS

Figure 1:
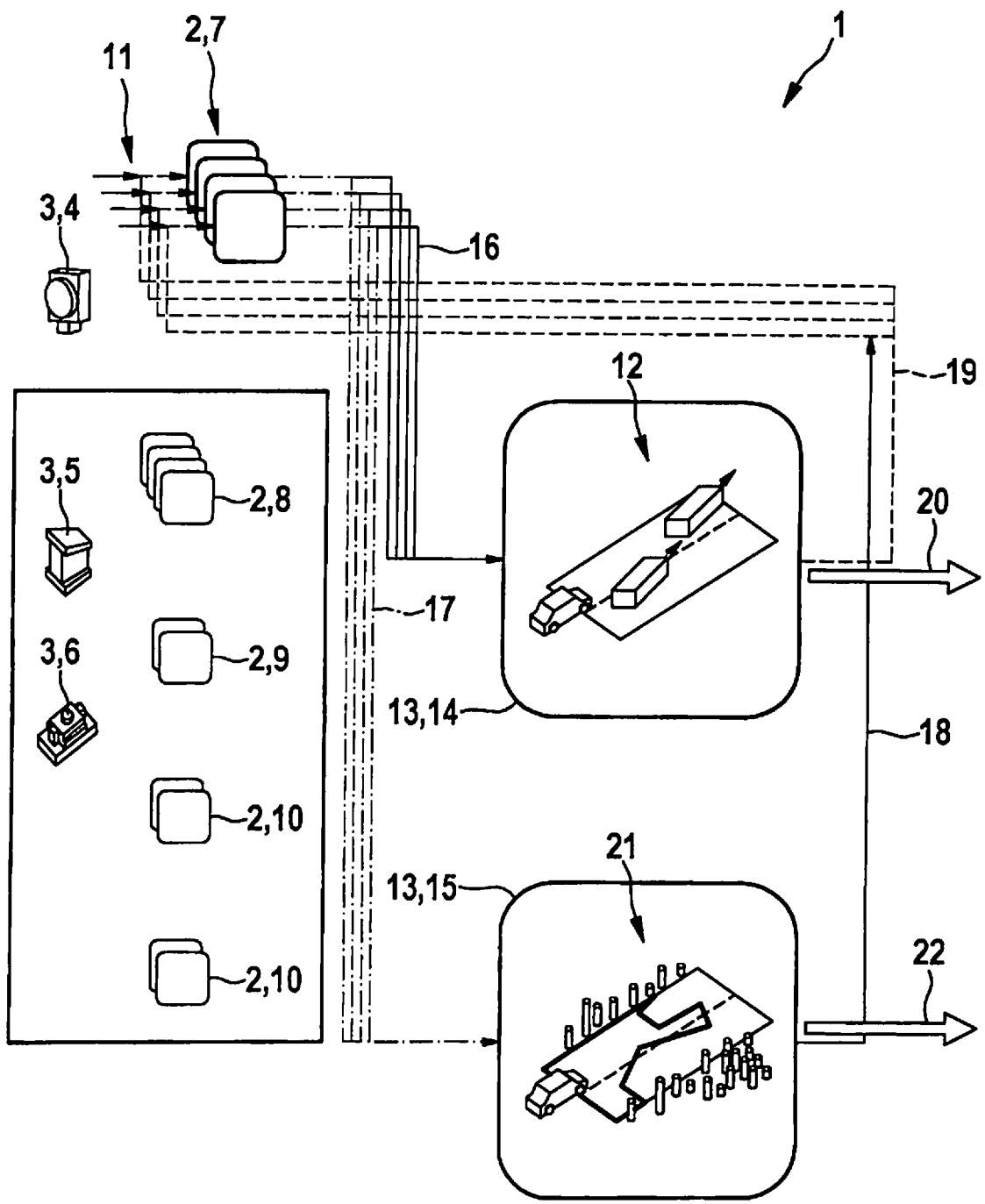
FIG. 1 shows an architecture of a system for sensing the driving environment of a vehicle, in accordance with a first specific embodiment of the present invention.

Like or similar components are denoted by the same reference numerals in the figures.

FIG. 1 shows an architecture of a system 1 for sensing the driving environment of a vehicle, in accordance with a first specific embodiment of the present invention. As illustrated in FIG. 1, a plurality of sensor models 2 are provided in system 1. Sensor models 2 are thereby each associated with physical sensors 3, of which a radar sensor 4, a lidar sensor 5, and a camera 6 are shown exemplarily in the drawing. Other sensors 3 may also be similarly provided in system 1. Sensor models 2 include a radar model 7, a lidar model 8, and a camera model 9 in correspondence with sensors 3. Other sensor models 10 are also provided here that may be used for the remaining sensors in correspondence with the remaining sensors that are not explicitly shown. FIG. 1 also shows that there are multiple instances of each of sensor models 2. This indicates that a plurality of units are provided for each sensor type 4, 5, 6, in conformance with the number of associated sensor model instances. Four radar models 7 are provided, indicating four units of radar sensors 4, although only one single unit is graphically illustrated. There are four instances of lidar model 8, two of the camera model, and two each of other models 10. System 1 treats each instance of each sensor model 2 equally. System 1 is structured to allow both additional instances of existing sensor models to be modularly added, as well as new sensor models for new sensor types.

This specific embodiment shows a snapshot of an instant when new measurements are performed by radar sensors 4. This is indicated by arrows 11 that are incoming from the left margin into radar models 7. This means that the radar system of the vehicle is currently receiving measurements, while the lidar system, the camera system and the remaining sensors are not processing any new measurements at the moment. This state is shown in such a way merely for the sake of clarity and purely exemplarily in order not to unnecessarily complicate the drawing. The assumption in a real case is that at least the camera system is constantly delivering new measurements, if it is not temporarily deactivated because of lack of need.

Sensor models 2 evaluate and process measurements 11. Each sensor model 2 may thereby decide to which object or data object 12 an incoming measurement signal 11 will be assigned.

In system 1, two world models are provided, one of which is a dynamic world model 14 and another a static world model 15. As soon as sensor model 2 creates a data object 12, more precisely, a dynamic data object 12, it is transferred to dynamic world model 14. In world model 14 illustrated here, a virtual street having a moving data object 12, in this case, an automobile, is shown. In this instance, the automobile is modelled by a cuboid that moves in different directions over time based on the updates to world model 14 in the driving environment model, respectively world model 14. Each sensor model 2 may also decide whether new tracks are to be created. This may signify, for example, that a sensor model 2 decides whether an additional automobile, that was previously not virtually present, is to be considered and shown in driving environment model 14, respectively world model 14. Sensor model 2 transfers the association, respectively assignment information, and also the initialization information in each case to dynamic world model 14. This holds for each instance of sensor model 2. This means it may occur that an instance of radar model 7 outputs an initialization information item to dynamic model 14, and another instance outputs an association information item, while the other two instances do not output anything at the actual point in time. This may change at a later point in time. Arrows 16 in the drawing indicate the data being transferred, respectively world model 14 receiving data objects 12, i.e., world model 14 receiving the association information and the initialization information pertaining to new objects 12.

Similarly, as indicated by arrows 17 in the drawing, sensor models 2 transfer confirmation information in each case on static world points, such as voxels or lines, and information about newly created static world points, to static world model 15.

A copy of static world 15 is continuously returned as feedback to individual sensor models 2 (see arrow 18); and a copy of dynamic world 14 is also returned to individual sensor models 2, respectively instances thereof (see arrow 19). Therefore, sensor models 2 may then include this feedback information in the computations and predictions thereof.

In addition, dynamic objects 12 of the dynamic world are output to a planning module, not explicitly shown here (see arrow 20). Specifically, this information sent to the planning module contains every moving or possibly moving object 12. This may be an object classified as an automobile or pedestrian. Moreover, dynamic estimates, such as accelerations, and shape assessments are passed on. Moreover, static objects 21 of static world 15 are output to the planning module (see arrow 22). Specifically, this information includes modelled obstacle points. In this context, it is necessary that the obstacle points each be confirmed by a plurality of closely related measurements. Moreover, it must be possible to assess with certainty that the obstacle points are not points at the ground level, for instance, nor points at the level of a bridge, for instance; thus, that they are real obstacle points.

Figure 2:
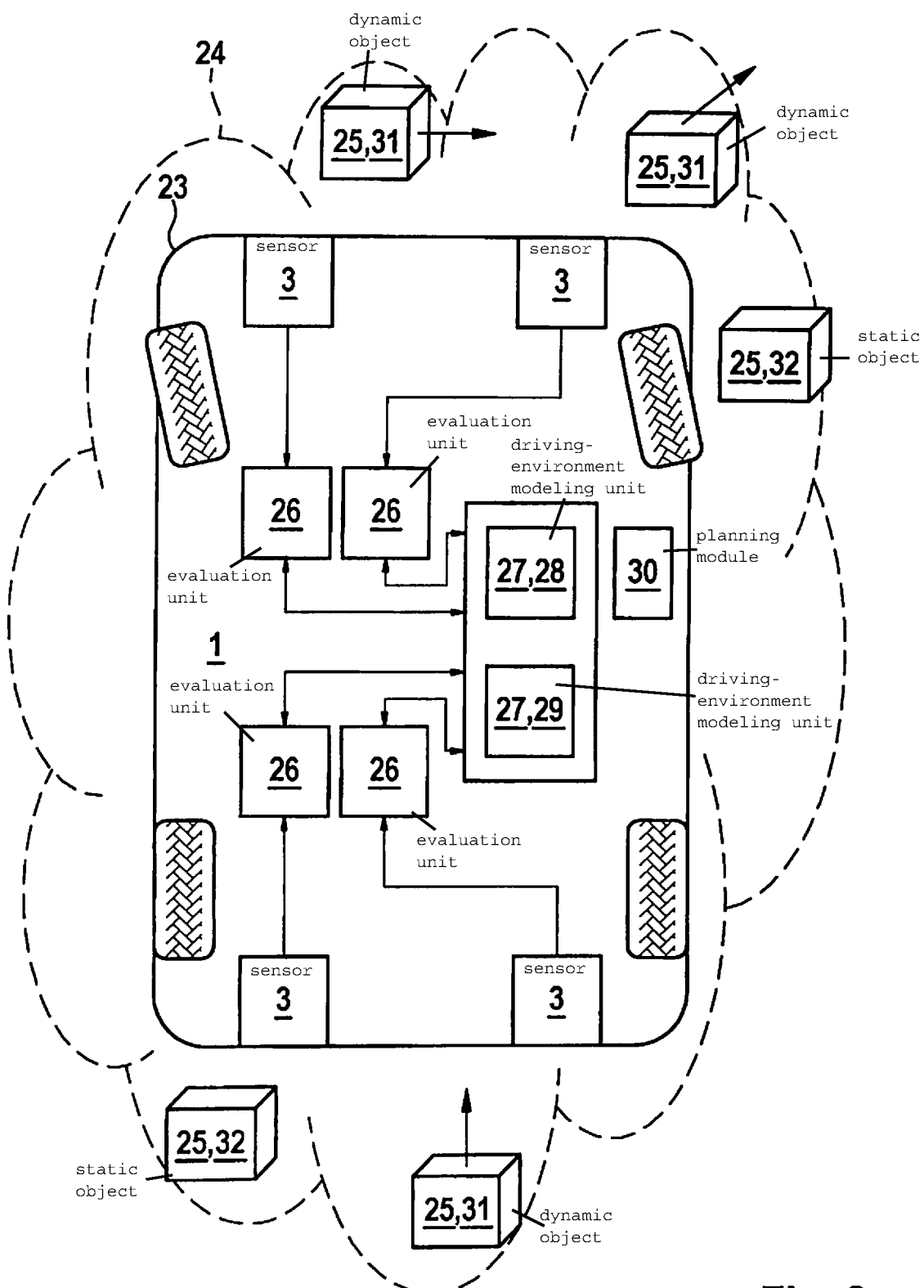
FIG. 2 is a schematic block diagram, which illustrates components of a system for sensing the driving environment of a vehicle, in accordance with a second specific embodiment of the present invention.

FIG. 2 is a schematic block diagram, which illustrates components of a system 1 for sensing the driving environment of a vehicle 23, in accordance with a second specific embodiment of the present invention.

Vehicle 23 is located in an environment 24, i.e., vehicle environment 24. Objects 25, which are to be captured by system 1, are located in the environment. Sensors 3 are used for that purpose. Sensors 3 are not limited to a specific type here and may be cameras or radar sensors, for example, or also other sensors.

System 1 features several evaluation units 26. Each evaluation unit 26 has a sensor model that is not explicitly shown in FIG. 2, but is in the above discussed FIG. 1. In addition, each evaluation unit 26 is bijectively associated with a sensor 3 and receives the measurements from the particular sensor 3. Each evaluation unit is linked to a driving-environment modeling unit 27. In the drawing, two driving-environment modeling units 27 are thereby shown, and each evaluation unit 26 is to be separately linked to each of driving-environment modeling units 27. Driving-environment modeling units 27 feature a first driving-environment modeling unit 28, which is able to compute a dynamic driving environment model, and a second driving-environment modeling unit 29, which is able to compute a static driving environment model. Thus, the architecture shown in FIG. 2 resembles that shown in FIG. 1. Moreover, this specific embodiment explicitly shows planning module 30 that is read out by driving-environment modeling unit 27.

As already mentioned above, real objects 25, which feature both dynamic objects 31 that are able to move, as well as static objects 32 that typically do not move, are present in environment 24. Furthermore, the operating principle of system 1 according to FIG. 2 corresponds to the principle already explained in connection with FIG. 1 and is, therefore, not described in greater detail here.

Figure 3:
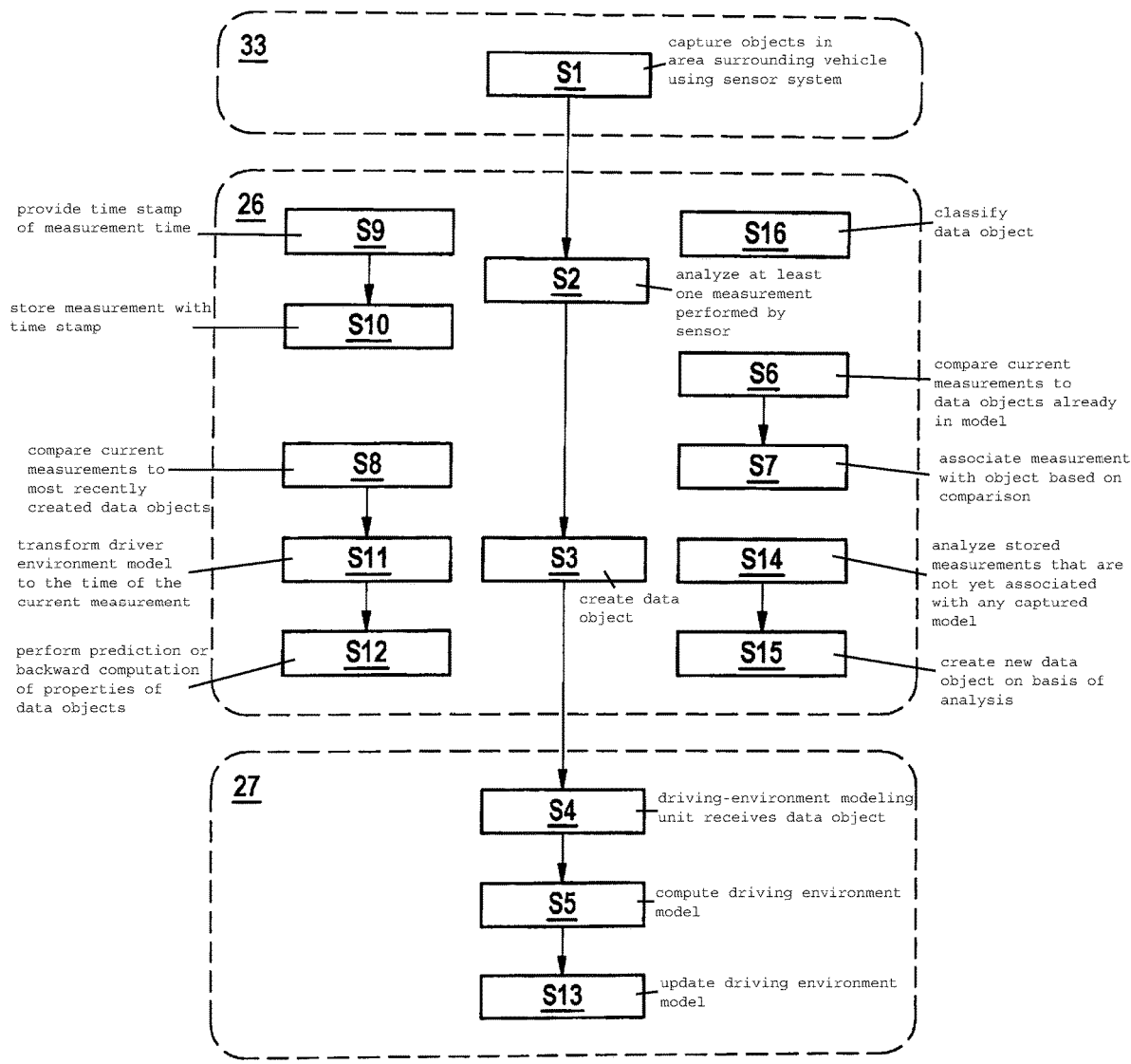
FIG. 3 illustrates a method for sensing the driving environment of a vehicle, in accordance with a third specific embodiment of the present invention.

FIG. 3 illustrates a method for sensing the driving environment of a vehicle, in accordance with a third specific embodiment of the present invention.

In step S1, objects in the area surrounding the vehicle are captured using a sensor system having a plurality of sensors. The sensor system is indicated in FIG. 3 by a dashed-line box denoted by reference numeral 33. The evaluation units are indicated analogously by a dashed-line box denoted by reference numeral 26. It is not taken into consideration here that, in reality, a plurality of sensors are present in sensor system 33, and that evaluation units 26 have a plurality of evaluation units. Instead, it is merely intended that the dashed-line boxes indicate the levels in which the method is executed. In step S2, at least one measurement performed by the sensor is analyzed by an evaluation unit 26 bijectively linked to a particular sensor; a sensor model being used for that purpose. On the basis of the analysis, evaluation unit 26 creates a data object in step S3 to describe an object captured by the sensor.

In step S4, the data object is received by a driving-environment modeling unit that is indicated in FIG. 3 by a dashed-line box denoted by reference numeral 27. In step S5, the driving-environment modeling unit computes a driving environment model based on the data objects, the driving environment model being less complex than the sensor model.

In step S6, current measurements are compared to data objects that are already present in the models. In step S7, on the basis of the comparison, a measurement is associated with an object described by the driving environment model.

In step S8, a copy of the current driving environment model, including the most recently created data objects from driving-environment modeling unit 27, is received in evaluation unit 26, for use in the sensor model.

In step S9, a time stamp of the measurement time is provided for a measurement; and, in step S10, the measurement is stored, together with the time stamp, in a buffer memory for a later use.

In step S11, which follows step S9, the driving environment model is transformed to the time of the current measurement. An intermediate movement of the vehicle is thereby included, in particular. In addition, in step S12, a prediction or a backward computation of properties of the data objects is performed, depending on whether the time of the measurement is later or earlier than the data objects.

In step S13, which follows step S5, driving-environment modeling unit 27 updates the driving environment model. Updating is thereby carried out on the basis of a sequence of times of the basic measurements performed by the sensors.

In step S14, evaluation unit 26 uses the sensor model to analyze a number of stored measurements that are not yet associated with any captured object. In addition, a new data object is created in step S15 on the basis of the analysis.

In step S16, the evaluation unit classifies a data object to describe a type of captured object.

FIG. 3 does not necessarily show the sequence and the interrelationship of the steps in the manner that may follow in a example. Instead, the purpose of FIG. 3 is merely to provide an overview of a few aspects of the present invention.

What is claimed is:

1. A method for sensing the driving environment of a vehicle, the method comprising:
    capturing objects in an area surrounding the vehicle using a sensor system having a plurality of sensors;
    for each of the plurality of sensors, analyzing at least one measurement performed by the sensor, using a sensor model, via a corresponding evaluation unit of a plurality of evaluation units that is bijectively linked to a corresponding one of the plurality of sensors;
    creating a data object to describe an object captured by the sensor, via each of the evaluation units, based on the analysis;
    receiving the corresponding data objects from the evaluation units by driving-environment modeling units linked to the evaluation units and its respective sensor model, each of the evaluation units being bijectively linked to the corresponding one of the plurality of sensors; and
    computing a driving environment model, that is useable as a basis for the control commands of a planning module of an at least partially automated or autonomous vehicle driving mode, via the driving-environment modeling units, based on the data objects;
    wherein the sensor model and the driving environment model are used so that the sensor model is made more complex than the driving environment model.

2. The method as recited in claim 1, wherein the plurality of sensors include a plurality of different types of sensors, the plurality of different types of sensors being used in parallel, and, depending on the sensor type and the evaluation unit, the sensor model being able to be used as one of a radar model, a lidar model, a camera model or an ultrasonic model.

3. The method as recited in claim 1, further comprising:
    associating, by the evaluation unit, a measurement with an object described by the driving environment model, the measurement being compared to existing data objects.

4. The method as recited in claim 1, further comprising:
    receiving, in the evaluation unit, a copy of a current driving environment model containing the most recently created data objects from the driving-environment modeling unit for use in the sensor model.

5. The method as recited in claim 1, further comprising:
    providing a measurement with a time stamp of the time of the measurement; and
    storing the measurement together with the time stamp in a buffer memory for a later use.

6. The method as recited in claim 1, further comprising:
    transforming, by the evaluation unit, the driving environment model to a time of a current measurement considering an intermediate movement of the vehicle; and
    implementing either a prediction or backward computation of properties of the data objects, depending on whether the time of the measurement is later or earlier than the data objects.

7. The method as recited in claim 1, further comprising:
    analyzing a number of stored measurements that are not yet associated with any captured object by the evaluation unit, using the sensor model, and producing a new data object on the basis of the analysis.

8. The method as recited in claim 1, wherein a dynamic driving environment model is used and the method further comprises:
    updating, by the driving-environment modeling unit, the driving environment model on the basis of a sequence of times of the basic measurements performed by the sensors.

9. The method as recited in claim 1, further comprising:
    classifying, by each evaluation unit, the data object to describe a type of a captured object.

10. The method as recited in claim 1, wherein a plurality of driving environment models are used in parallel, that: (i) have at least one dynamic driving environment model and at least one static driving environment model, and (ii) describe a first dynamic driving environment model having a lower complexity that is updated by a Kalman filter and that describes a respective object using a cuboid, and a second dynamic driving environment model having a greater complexity that is updated by a particle filter and that describes a respective object using a more complex shape than a cuboid.

11. The method as recited in claim 1, wherein the sensor model has a quadratic complexity, and a driving environment model has a linear complexity.

12. A system for sensing the driving environment of a vehicle, comprising:
    a plurality of sensors for capturing objects in an area surrounding the vehicle;
    a plurality of evaluation units, a respective evaluation unit being bijectively associated in each case with a specific one of the sensors and being adapted for analyzing a measurement performed by the specific one of the sensors using a sensor model, and for creating a data object to describe a particular object captured by the specific one of the sensors; and
    driving-environment modeling units linked to each of the evaluation units and its respective sensor model, each of the evaluation units being bijectively linked to the corresponding one of the plurality of sensors, and adapted for computing a driving environment model to describe the environment of the vehicle on the basis of the data objects, the driving environment model being used as a basis for control commands of a planning module of an at least partially automated vehicle driving mode;

wherein the evaluation units and the driving-environment modeling units being configured in each case so that the sensor model has a greater complexity than the driving environment model.

\* \* \* \* \*